(12) United States Patent
Gartland et al.

(10) Patent No.: US 10,445,343 B2
(45) Date of Patent: Oct. 15, 2019

(54) SYSTEMS AND METHODS FOR DATA EXCHANGE AND CONVERSION

(71) Applicants: William J. Gartland, Fairfield, CT (US); Timothy Monahan, Somers, NY (US)

(72) Inventors: William J. Gartland, Fairfield, CT (US); Timothy Monahan, Somers, NY (US)

(73) Assignee: Interactive Data Pricing and Reference Data LLC, Bedford, MA (US)

( * ) Notice: Subject to any disclaimer, the term of this patent is extended or adjusted under 35 U.S.C. 154(b) by 541 days.

(21) Appl. No.: 15/210,036

(22) Filed: Jul. 14, 2016

(65) Prior Publication Data

US 2017/0017712 A1 Jan. 19, 2017

Related U.S. Application Data

(60) Provisional application No. 62/193,443, filed on Jul. 16, 2015.

(51) Int. Cl.
| | |
|---|---|
| *G06F 16/00* | (2019.01) |
| *G06F 16/28* | (2019.01) |
| *G06F 16/21* | (2019.01) |
| *G06F 16/25* | (2019.01) |
| *G06Q 40/04* | (2012.01) |

(52) U.S. Cl.
CPC ............ *G06F 16/285* (2019.01); *G06F 16/21* (2019.01); *G06F 16/258* (2019.01); *G06Q 40/04* (2013.01)

(58) Field of Classification Search
CPC ......... G06F 17/30598; G06F 17/30569; G06F 17/30289; G06F 16/285; G06F 16/21; G06Q 40/04; G06Q 40/041
See application file for complete search history.

(56) References Cited

U.S. PATENT DOCUMENTS

| | | | |
|---|---|---|---|
| 7,505,984 B1* | 3/2009 | Nevill-Manning | ......................... G06F 17/2211 |
| 9,576,296 B2* | 2/2017 | Hansen | ................ G06Q 10/087 |
| 2002/0184131 A1* | 12/2002 | Gatto | .................... G06Q 40/00 705/36 R |
| 2005/0154628 A1* | 7/2005 | Eckart | .................... G06Q 30/02 705/35 |

(Continued)

*Primary Examiner* — Leslie Wong
(74) *Attorney, Agent, or Firm* — DLA Piper LLP (US)

(57) ABSTRACT

Systems and methods for data conversion and distribution. A data collection system receives data from plural data sources; extracts data values for each data source from the data; classifies each extracted value among categories; and stores each extracted value in a database according to a data mapping based on a category index, such that the extracted value is stored according to the associated category index. A data performance system retrieves, for each category, data values associated with the category and a predetermined period, by querying the database based on the category index; and runs, for each category, the retrieved data through statistical algorithms, to generate data performance metrics representative of the data from all of the data sources. A data distribution system generates a predictive performance metric for further data based on a comparison between the further data and the data performance metrics for at least one category.

21 Claims, 8 Drawing Sheets

(56) References Cited

U.S. PATENT DOCUMENTS

| | | | |
|---|---|---|---|
| 2008/0294996 A1* | 11/2008 | Hunt | G06Q 30/02 |
| | | | 715/739 |
| 2011/0184760 A1* | 7/2011 | Shen | G06Q 10/10 |
| | | | 705/3 |
| 2012/0317053 A1 | 12/2012 | Gartland et al. | |
| 2013/0138577 A1* | 5/2013 | Sisk | G06Q 30/02 |
| | | | 705/36 R |
| 2013/0218745 A1* | 8/2013 | Hansen | G06Q 10/087 |
| | | | 705/37 |
| 2015/0169515 A1 | 6/2015 | Hagen et al. | |
| 2016/0092557 A1* | 3/2016 | Stojanovic | G06F 17/30554 |
| | | | 707/723 |
| 2016/0335674 A1* | 11/2016 | Plourde | G06Q 30/0251 |

\* cited by examiner

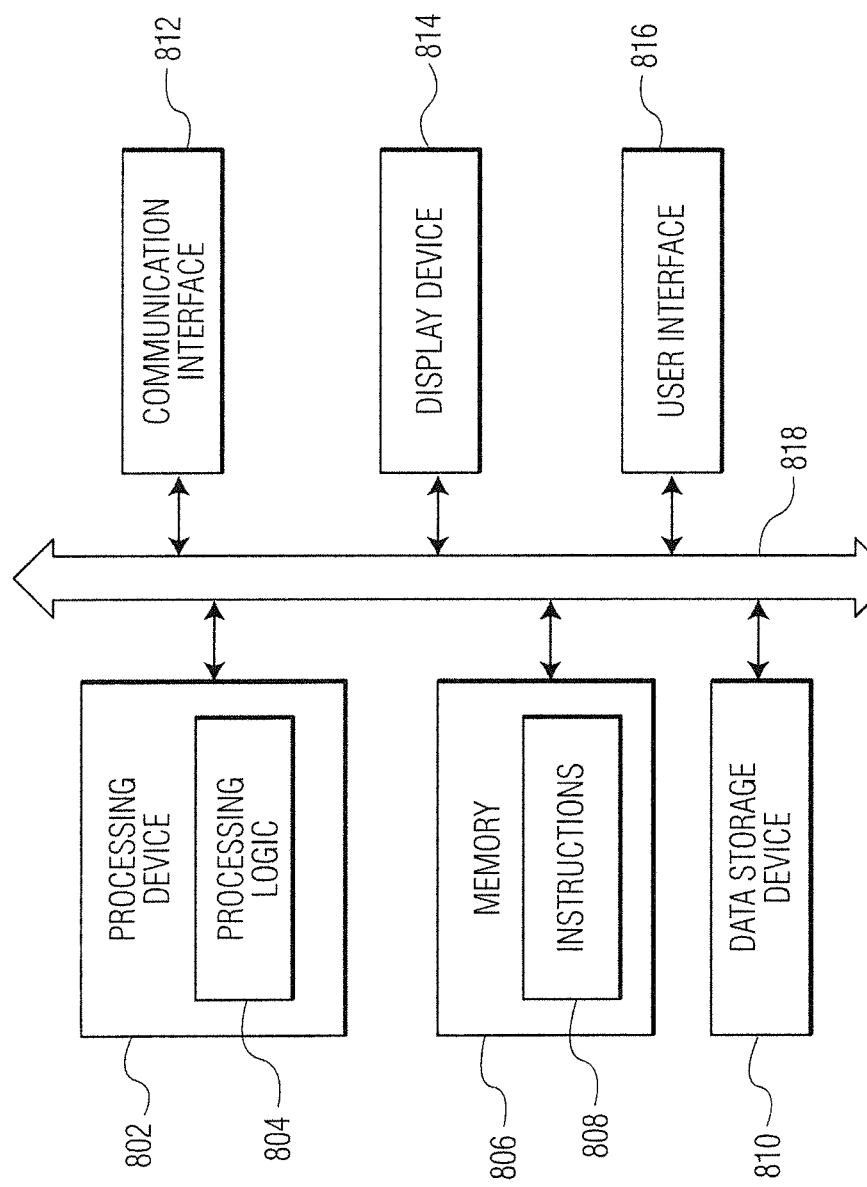

SYSTEMS AND METHODS FOR DATA EXCHANGE AND CONVERSION

TECHNICAL FIELD

The present disclosure relates generally to improving electronic data conversion and distribution and, in particular, to systems and methods for electronic data conversion and distribution of electronic data performance metrics and predictions of data performance where electronic data is sparse.

BACKGROUND

Problems exist in the field of electronic data conversion and distribution. Users of data classes with sparse electronic data often seek additional information in order to analyze or otherwise utilize these data classes. One use of electronic data is in the creation of data projections (or other statistical analyses/applications) for those data classes having sparse electronic data (e.g., limited historical data). Because the electronic data is sparse, it may be difficult to obtain the additional electronic data and information needed, at desired time(s) and/or in desired data types and volumes, in order to generate accurate data projections. Indeed, accurate projections (and other forms of statistical analyses) typically require a large amount of historical electronic data and/or information. In the absence of sufficient data and information, conventional projections (based on the sparse data and information) are often inaccurate and unreliable. Accordingly, there is a need for improved data conversion and distribution systems which are able to generate accurate projections in a timely manner, even if the data being projected is sparse.

SUMMARY

Aspects of the present disclosure relate to systems, methods and non-transitory computer-readable storage media for data conversion and distribution. A data conversion and distribution system includes a data collection system, a data performance system and a data distribution system. The data collection system may be configured to receive electronic data from each of a plurality of electronic data sources via electronic communication over a network; extract, for each electronic data source, one or more data values from the corresponding received electronic data; classify, for each extracted data value from each electronic data source, the extracted data value among one or more predetermined categories, and store each extracted data value from each electronic data source in a first database according to a data mapping based on a category index corresponding to each predetermined category, such that the respective extracted data value is stored according to the category index associated with the corresponding classified category. The data performance system may be communicatively coupled to the data collection system. The data performance system may be configured to retrieve, from the first database, for each predetermined category, stored data values associated with the respective predetermined category and a predetermined time period, by querying the first database based on the respective category index; and run, for each predetermined category, the respective retrieved data through one or more statistical algorithms, to generate data performance metrics for the respective predetermined category representative of the electronic data from all of the plurality of electronic data sources. The data distribution system may be communicatively coupled to the data collection system and the data performance system. The data distribution system may be configured to generate a predictive performance metric for further electronic data based on a comparison of the further electronic data to the data performance metrics for at least one of the one or more predetermined categories. The data collection system, the data performance system and the data distribution system include one or more computers.

BRIEF DESCRIPTION OF DRAWINGS

FIG. 8 is a functional block diagram of an example computer system, according to an aspect of the present disclosure.

DETAILED DESCRIPTION

Figure 1:
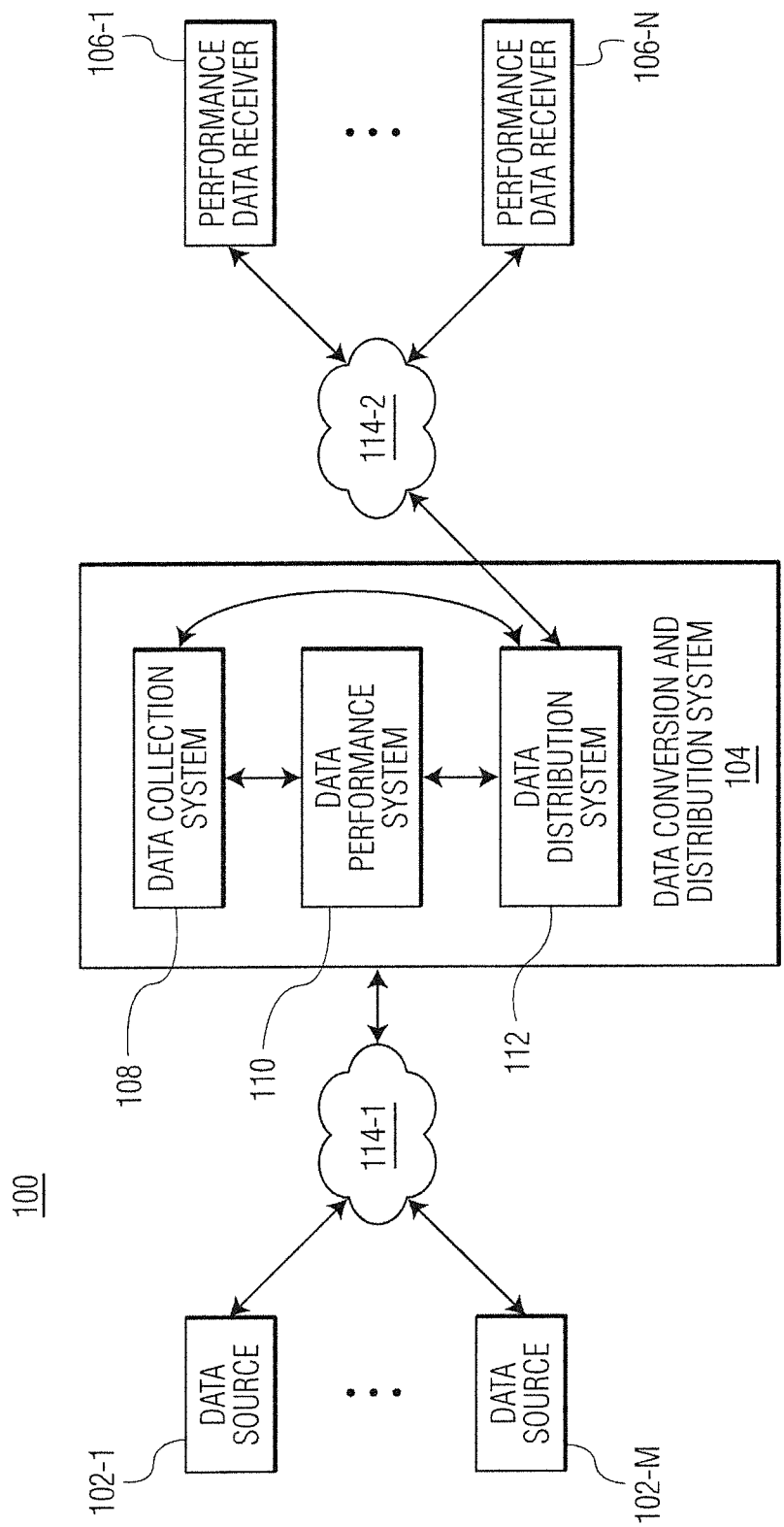
FIG. 1 is a functional block diagram of an example electronic data exchange environment including an example data conversion and distribution system, according to an aspect of the present disclosure.

Aspects of the present disclosure generally relate to systems and methods for data conversion and distribution. In one aspect, the disclosed systems and methods may be used to provide data performance metrics for sparse data classes. It should be understood, however, that the systems and methods described herein are not limited thereto, but instead may be used in other suitable applications. An exemplary system may include a data collection system for aggregating and mapping data from multiple sources to a first database, a data performance system to determine performance metrics based on the aggregated data and a data distribution system to determine a predictive performance metric for additional data based on the aggregated data performance metrics and distribute the predictive performance metric to a receiver.

In an example embodiment, the data collection system may receive electronic data from each of a plurality of electronic data sources. The electronic data may include, without being limited to, electronic data feed(s), electronic data file(s), email(s) and/or text message(s). The data collection system may extract, for each data source, one or more data values from the received data and classify each extracted value among one or more predetermined categories. The data collection system may then store each extracted (and classified) data value from each data source in a first database according to a data mapping based on a category index corresponding to each predetermined category. In this manner, the respective extracted data value may be stored according to the category index associated with the classified category.

In some examples, the data collection system may receive a large volume of electronic data (e.g., millions of data points) which may be frequently updated (e.g., every 15 mins). Because the data collection system extracts and stores only the data values (and any associated information) needed for data performance analyses, in a specific database, the data collection system may reduce the amount of information that needs to be classified (i.e., processed) and stored in the database. Because the data collection system classifies the extracted data values into predetermined categories and stores the classified data values in the first database in a specific manner (i.e., aggregated from multiple data sources and arranged in the database based on a category index), data in the database can be retrieved more efficiently, by querying the database based on the category index. Accordingly, the data collection system may improve the speed of storing large volumes of rapidly received data and the speed at which it may be subsequently retrieved and processed.

In an example embodiment, the data collection system may further determine a difference value between each extracted data value and an independent benchmark value. The difference value may create an unbiased reference point used to measure the data performance metrics for the data (received from among multiple data sources). The difference values associated with the extracted data values may be stored in the database, and used to determine the data performance metrics.

In an example embodiment, the data performance system may retrieve, for each predetermined category, stored data values (such as the difference values) associated with the respective predetermined category and a predetermined time period. The data performance system may run the retrieved data through one or more statistical algorithms to generate data performance metrics for the predetermined category that is representative of the electronic data from all of the data sources. In one non-limiting implementation, for example, the electronic data may include transaction data corresponding to an asset in an asset class, and the data performance metrics include statistical profile representative of transaction data execution quality for all retrieved transaction data in a corresponding predetermined category. The data performance system may store the data performance metrics for each category in a second database, such as for use by the data distribution system.

In an example embodiment, the data distribution system may generate a predictive performance metric for further electronic data, for example, based on a request from a receiver. The predictive performance metric may be based on a comparison of the further electronic data to the data performance metrics (stored in the second database) for at least one of the one or more predetermined categories. In this manner performance metrics may be estimated for a sparse data set (such as the further electronic data) based on the observations (i.e., the performance metrics) determined from the aggregated data from among all of the data sources. The data distribution system may transmit the predictive performance metric, as well as other requested information, to the receiver.

Turning now to FIG. 1, FIG. 1 is a functional block diagram illustrating an example electronic data exchange environment 100 for data conversion and distribution, according to aspects of the present disclosure. Environment 100 may include one or more data sources (i.e., data source 102-1, . . . , data source 102-M, where M is an integer greater than or equal to 2), data conversion and distribution system (DCDS) 104 and one or more performance data receivers 106 (i.e., receiver 106-1, . . . , receiver 106-N, where N is an integer greater than or equal to 1). Each of data sources 102, DCDS 104 and data performance receivers 106 may comprise one or more computing devices (such as computer system 800 shown in FIG. 8, for example), including a non-transitory memory storing computer-readable instructions executable by a processing device to perform the functions described herein. Although the description herein describes environment 100 having two or more data sources 102, in some examples, environment 100 may include one data source 102 (i.e., where M is equal to 1). Although system 100 is described in some examples below with respect to data classes associated with electronic instrument data, system 100 may be used with any type of electronic data, including those having sparse (i.e., limited) data.

Data sources 102, DCDS 104 and benchmark data receivers 106 may be communicatively coupled via one or more networks 114. FIG. 1 illustrates an example where DCDS 104 is coupled to data sources 102 via network 114-1, and DCDS 104 is coupled to performance data receivers 106 via separate network 114-2. For example, the use of separate networks 114-1, 114-2 may prevent direct communication between performance data receivers 106 and data sources 102. Alternatively, the networks 114-1, 114-2 may be linked and/or may be a single large network. Although not shown, components of DCDS 104 (i.e., data collection system 108, data performance system 110 and data distribution system 112) may be communicatively coupled to each other directly and/or via an internal network (not shown). Networks 114 may include, for example, a private network (e.g., a local area network (LAN), a wide area network (WAN), intranet, etc.) and/or a public network (e.g., the Internet).

Data sources 102 may include any data source device that includes data and information directly, indirectly and/or tangentially related to a data class. In general, the electronic data and/or information may include suitable real-time data and/or archived data which may be related to a data class having sparse data, and that may be useful for determining statistical analyses information, data performance metrics and/or performance prediction metrics for the data class.

Data sources 102 may include internal and external data sources which may provide real-time and archived information. Internal data sources may include data sources that are a part of a particular entity seeking to generate statistical information for a data class that pertains to that particular entity. External data sources may include sources of data and information other than the entity that is seeking to generate the statistical information. For example, in one type of organization, data sources 102 may include internal data related to sales, purchases, orders and transactions. Data sources 102 may also include data aggregators that may store information and data related to multiple data classes. Data aggregators may themselves obtain the data and information from a plurality of other internal and/or external data sources. In some examples, the data sources 102 may include information regarding current activity data, reference data and security information (all of which may vary by industry). In some examples, data sources 102 may include news media outlets, exchanges, regulators, and the like. Data sources 102 may contain information related to domestic and foreign products and/or services.

In one non-limiting example, data sources 102 may include external and internal sources that may contain market data information (e.g., pricing information and benchmark pricing information) for various data classes. For example, data sources 102 may contain reference data and information for one or more instruments (e.g., terms and conditions for various instruments such as bonds, securities, options, futures, derivatives, etc.), regulator-based transaction data feeds for various instruments, price update information for various instruments (e.g., from data aggregators and/or unstructured data contained in emails), structured market data feeds (e.g., for benchmark yields supplied by sell-side banks and interdealer brokers), current offering levels (e.g., available from exchanges) and other market data information (e.g., over-the-counter fixed income market). For example, a substantial amount of pricing information may be extracted (e.g., by data collection system 108) by parsing unstructured data (i.e., data without any particular arrangement, sequence or format) contained in e-mails. The information from these messages may often be the most timely way to assess changes in the market's perception of value.

DCDS 104 may include data collection system 108, data performance system 110 and distribution system 112. In some examples, data collection system 108, data performance system 110 and distribution system 112 may be embodied on a single computing device. In other examples, data collection system 108, data performance system 110 and distribution system 112 may refer to two or more computing devices distributed over several physical locations, connected by one or more wired and/or wireless links. It should be understood that DCDS 104 refers to a computing system having sufficient processing and memory capabilities to perform the following specialized functions, and it does not necessarily refer to a specific physical location. An example computing system that may represent DCDS 104 is described below with respect to FIG. 8.

Data collection system 108 may be configured to receive electronic data from each data source 104 and extract data value(s) and/or information (from each data source 102) that may be useful for determining data performance metrics. The electronic data may be represented in one or more data forms including, without being limited to, electronic data files, electronic data feeds, electronic messages, etc., and may also correspond to different data formats. Data collection system 108 may receive electronic data from data sources 102 in real-time, based on a predetermined event and/or on a periodic basis (e.g., once per day at a predetermined time). In general, data value(s) and/or information may represent a portion of data extracted from the electronic data from a data source 102. In this manner, data collection system 108 may dictate processing only the type and volume of data and information that is pertinent to generating statistical information (e.g., data performance metrics) related to one or more data classes for which directly-related or historical information is sparse or unavailable.

Data collection system 108 may classify the extracted data value(s) and/or information into one or more predetermined categories, as well as assign any attributes to each extracted data value and/or information associated with the classified category. Data collection system 108 may also, for each extracted data value, identify and apply a corresponding benchmark value, to generate difference value(s) of the extracted data value relative to the benchmark value. Data collection system 108 may map and aggregate the combined information (i.e., the extracted data value(s) and/or information and difference value(s)) to a first database (such as database 208 of FIG. 2) such that the corresponding combined information is indexed according to the corresponding predetermined category. Each extracted data value and/or information may be associated with a timestamp. Data in each category may also be further indexed according to various predetermined times based on the timestamp. In this manner, data in first database 208 may be accessed based on a predetermined category and the predetermined times. In some examples, data collection system 108 may authenticate each data source 102 and/or validate electronic data received from each data source 102. In some examples, data collection system 108 may include a secure network connection between data collection system 108 and each data source 102. Data collection system 108 is described further below with respect to FIG. 2.

Data performance system 110 may be configured to query first database 208 (FIG. 2) of data collection system 108 to retrieve at least a portion of the combined information associated with each category and for a predetermined period of time. Data performance system 110 may execute one or more statistical processes (e.g., statistical modeling, algorithms, etc.) using the retrieved combined data from among all of data sources 102 to generate data performance metrics for each category over a particular time period. In one example, the difference value may represent a difference between a reported transaction price and a concurrent continuous evaluated price for transactions (involving goods and/or services) over a predetermined look-back period (e.g., 20 days). The data performance metrics may represent a transaction price distribution for the price differences for a range of transactions in a particular category. The data performance metrics, for each category and predetermined time period, may be stored in a second database (e.g., database 308 in FIG. 3). Data performance system 110 is described further below with respect to FIG. 3.

Data distribution system 112 may be configured to communicate with performance data receivers 106, as well as data performance system 110 and data collection system 108. Data distribution system 112 may receive request(s) for performance data from one or more receivers 106 related to a particular data set (which may include a sparse data set). Data distribution system 112 may generate one or more predictive performance metrics for the particular data set based on a comparison of the particular data set to the data performance metrics stored in the second database 308. Data distribution system 112 may transmit the predictive performance data metric(s) to the requesting receiver 106. In one example, data distribution system 112 may generate a best execution score for particular transaction information that predicts the execution quality of the particular transaction, relative to the observed behavior provided by the transaction price distribution determined by data performance system 110.

In this manner, data distribution system 112, in combination with data performance system 110, is able to produce predictive data performance metrics for data classes without sufficient direct data to generate the predictions (e.g., data classes having sparse electronic data). In some examples, data distribution system 112 may include an application programming interface (API), having a suitable web service protocol for communication with receivers 106. The data distribution API may be used with receiver-facing applications. Receivers 106, with the proper entitlements, may integrate the distribution API into their proprietary systems. Use of industry standard protocols may minimize the effort needed to access the functionality of DCDS 104. Data distribution system 112 is described further below with respect to FIG. 4.

Receivers 106 may represent any electronic device or application on an electronic device configured to receive predictive performance metric(s) (as well as other data and/or information) for one or more data sets. In one example, receivers 106 may be used by data managers, data analysts, regulatory compliance teams and the like.

In some examples, data distribution system 112 may interact with one or more public API's configured to communicate with one or more client applications that operate on an electronic device (where a client application may represent receiver 106). Client(s), through the client application(s), may access the analysis (and other) information provided by DCDS 104 via interaction with the public API. The public API may incorporate user authentication and/or entitlement features to prevent unauthorized access to DCDS 104. Client applications may represent external applications built and maintained by clients for implementing data performance analyses.

Figure 7:
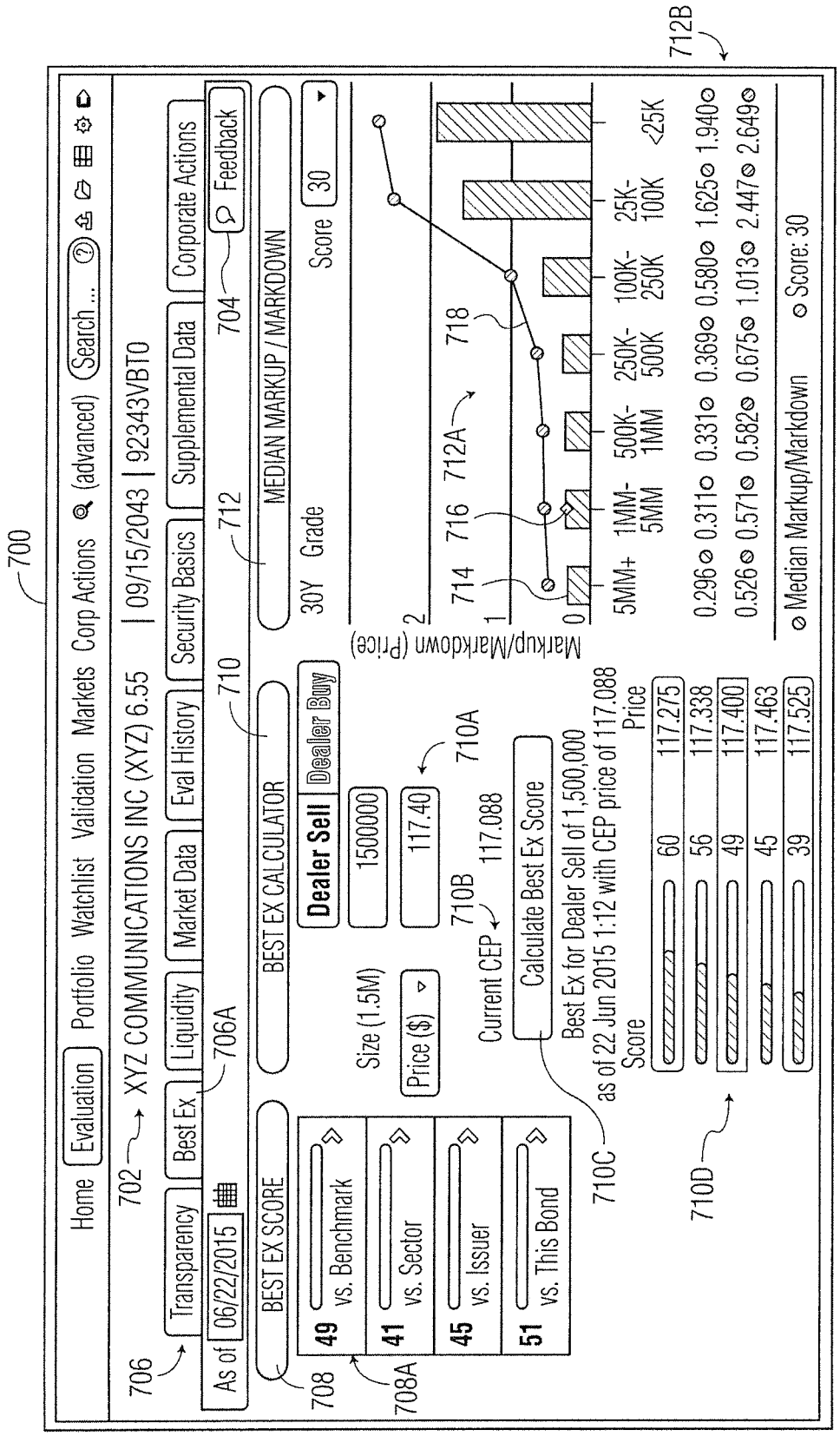
FIG. 7 is a schematic representation of an example graphical user interface used in connection with an aspect of the present disclosure.

In some examples, data distribution system 112 may communicate with one or more application servers configured to communicate with one or more web-based applications accessible by an electronic device (where a web-based application may represent receiver 106). An application server may provide the web-based application with centralized access to information used to render graphical user interface displays on a web page (such as shown in FIG. 7). The application server(s) may be configured to include enforcement of entitlements that control access to web pages, along with technical services such as security search/lookup tools, access to historical data and data caching logic (e.g., that may improve the performance of the web-based application to access information). An example desktop application may include a web application that provides access to benchmark pricing values and end-of-day pricing values, along with other content and analytics, such as corporate actions, liquidity scores and a workflow tool used by fund valuation specialists to verify the prices being used to calculate a fund's official Net Asset Value (NAV). In one example, the web-based application may provide clients with a set of screens that give various views of the predictive performance metrics (e.g., a best execution quality analysis) on a transaction-by-transaction basis. In some examples, the desktop application may include a calculator interface to allow clients to assess the sensitivity of a particular performance metric score to changes in one or more input values.

Figure 2:
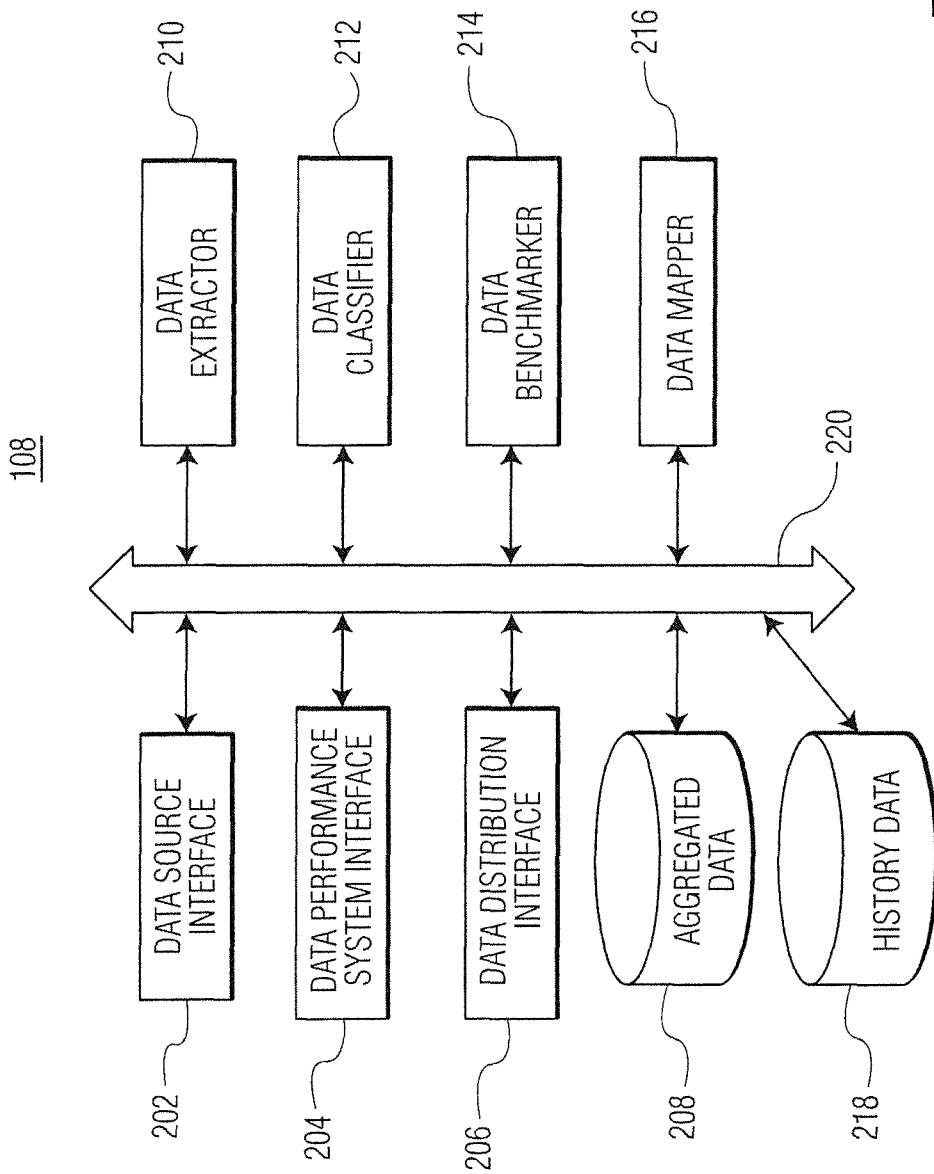
FIG. 2 is a functional block diagram of an example data collection system of a data conversion and distribution system according to an aspect of the present disclosure.

FIG. 2 is a functional block diagram of example data collection system 108, according to an aspect of the present disclosure. Data system 108 may include data source interface 202, data performance interface 204, data distribution interface 206, aggregated data database 208, data extractor 210, data classifier 212, data benchmarker 214, data mapper 216 and history database 218, which may communicate with each other via data and control bus 220. Although not shown, in some examples, data collection system 200 may include a controller (e.g., a processor, a microcontroller, a circuit, software and/or other hardware component(s)) specially configured to control operation of data source interface 202, data performance interface 204, data distribution interface 206, aggregated data database 208, data extractor 210, data classifier 212, data benchmarker 214, data mapper 216 and history database 218.

Data source interface 202 may be configured to communicate with data sources 102 (FIG. 1) via a network (e.g., see network 114-1 of FIG. 1) (and/or via a direct connection), to receive electronic data that may be useful for determining data performance metrics. In some examples, the network connection may include a secure connection with one or more of data sources 102. Although not shown, data source interface 202 may also receive other information from among data sources 102 that may be useful for analyses and presentation to receivers 106, and store this additional information in one or more databases (e.g., including in database(s) storing historical data).

As discussed above, the electronic data may be in various data forms and/or different data formats. In one example, the electronic data may include independent estimates of current and/or historical market prices for particular assets, market-wide coverage of transaction data from particular market sectors (e.g., a transaction price, a transaction size, a time of the transaction, a transaction direction (dealer buy, dealer sell, interdealer information), reference data for each asset (e.g., issuer, maturity date, credit quality/credit rating, industry sector) information. The independent current/historical estimates may vary by data class (e.g., asset class), a liquidity of assets in the asset class and the amount of direct market data observations received for an asset class, an issuer and other similar assets in its industry. For example, currently, prices for US corporate bonds (e.g., an example data class) may update from several times a day to several times per minute.

Notably, any type of data may be included in the electronic data, depending upon the particular industry and/or implementation for the DCDS 104 of the present disclosure. In general, data source interface 202 may be configured to receive electronic data from multiple data sources 102, where data transferred from each data source 102 may include a large volume of electronic data (e.g., millions of data points) which may be frequently updated (e.g., every 15 mins). In some examples, data source interface 202 may authenticate data source(s) 102 and/or validate electronic data received from data source(s) 102. In one example, the electronic data may include market transaction data, intraday benchmark price data, security reference data, client transaction data as well as other market-related information associated with various data classes (e.g., asset classes).

In one example, data source interface 302 may receive asset reference data for bonds (e.g., about 30,498 bonds outstanding in the US corporate bond market). Data source interface 302 may also receive regulator supplied market transaction feed data, including a Transaction Reporting And Compliance Engine (TRACE) feed associated with the Financial Industry Regulatory Agency (FINRA) (that reports transactions in US Corporate bonds, US Agency debentures, agency mortgage-backed securities and certain structured products, within 15 minutes of the transaction execution time) and a Municipal Securities Rulemaking Board (MSRB) data feed (that reports municipal bond transactions). For example, the TRACE feeds currently provides information on about 1,189,124 transactions for about 20,142 unique securities, and the MSRB feed currently provides information on about 699,226 transactions for about 107,144 unique securities. The independent estimated data may include approximately 10 million price updates per day for the US Investment Grade, US High Yield and Europe, Middle East and Africa (EMEA) Sovereigns and Credit market sectors, combined. An additional 51 million updates of estimated evaluations may be published for the US Municipal bond sector. In one example, the independent estimated data includes a continuous evaluated price (CEP) that is used as a benchmark value to generate the data performance metrics. In one example, data source interface 202 may receive market information from approximately 7 million individual market data points collected from various other market data feeds and sources (e.g., structured market data feeds, current offering levels, emails including pricing information).

Data performance interface 204 may be configured to securely communicate with data performance system 110, to provide data performance system 110 access to the aggregated data in database 208, for determination of data performance metrics. Data distribution interface 206 may be configured to securely communicate with data distribution system 112, to provide data distribution system 112 access to data and/or information related to one or more data sets (e.g., in addition to predictive performance metrics (such as historical data in database 218).

Data extractor 210 may be configured to extract data and/or information from the receive electronic data from each data source 102. The extracted data/information may include a transaction price (i.e., a data value) and associated information (e.g., transaction size, time of transaction, transaction direction, asset class, etc.) for an asset that may be useful for determining data performance metrics. In some examples, data extractor 210 may extract the data/information from a portion of one or more market data feeds. In some examples, data extractor 210 may parse data (e.g., unstructured or structured data) contained in one or more emails or text messages and extract suitable data/information useful for data performance analysis. Thus, data extractor 210 may act as a filter, to reduce the number of data values/information needed for data performance analysis (performed by data performance system 110). In some examples, data extractor 210 may also route transaction-related information for an asset (extracted from the received data) to data classifier 212, and may route benchmark data values and corresponding timestamp information from independent reference price data source(s) 106 to history database 218.

Data classifier 212 may be configured to classify each extracted data value(s) (and any associated information) for an asset to one or more predetermined categories. In one example, the categories may reflect a maturity and credit quality of an asset type (e.g., bond). For example, the categories may include a transaction type, a credit group, a maturity band, an issuer, an asset symbol, etc. In some examples, one or more attributes may be assigned to a category, such as, without being limited to, industry sector, assets from a same issuer, all transactions from a particular asset. Data classifier 212 may compare the extracted data/information to information associated with each predetermined category (and any attributes if included in the predetermined category) and assign the extracted data/information to a predetermined category (and any attributes). The assignment by data classifier 212 may include a classification indication (and any assignment indications). In one example, 294 categories may be assigned to a data class.

Data benchmarker 214 may be configured to identify and retrieve, for each classified data value(s)/associated information for an asset, a corresponding benchmark value from history database 218 (and/or from among data sources 106 directly). For example, the associated information (of a data value) may be used to query history database 218 to identify a reference price corresponding to a time of the transaction and a data class. Data benchmarker 214 may also be configured to determine a difference value between the data value and the retrieved benchmark value.

Data mapper 216 may be configured, for each classified data value/associated information for an asset, to map the data value, associated information and the difference information (i.e., combined information) to one or more storage locations in aggregated data database 208 based on the classification indication (as well as any attribute information) such that the combined information is indexed according the corresponding predetermined category. Data mapper 212 may further map the combined data to database 208 according to timestamps in the combined information, such that the combined data is indexed according to a predetermined time. In this manner, the indexing of data in database 208 based on category and time may improve the efficiency of data retrieval for subsequent analysis by data performance system 110. As a result, fewer system resources may be needed to perform the subsequent data performance analysis.

Aggregated data database 208 may be configured to store combined information for each asset from electronic data received from one or more data sources 102 indexed according to predetermined categories and predetermined times. Thus, data received from one or more data sources 102, is aggregated (i.e., combined and mapped) into database 208 based on predetermined categories and times.

History database 218 may be configured to store benchmark data values for one or more time periods for one or more data classes. For example, the DCDS 104 may retrieve previously published benchmark price data as of a particular timestamp, in order to perform post-transaction execution quality evaluations. For example, clients may submit their records of executed transactions to be evaluated on a nightly, weekly, monthly or quarterly basis. Clients may also use request that DCDS 104 perform "what-if" analyses, which may include transactions that were not completed. In some examples, history database may include transaction data and benchmark price data. In one example, history database 208 may store approximately 14 months of data "live" to facilitate the analysis of transactions as old as 1 year (e.g., for 252 days per year and about 60 million benchmark prices per day).

Figure 3:
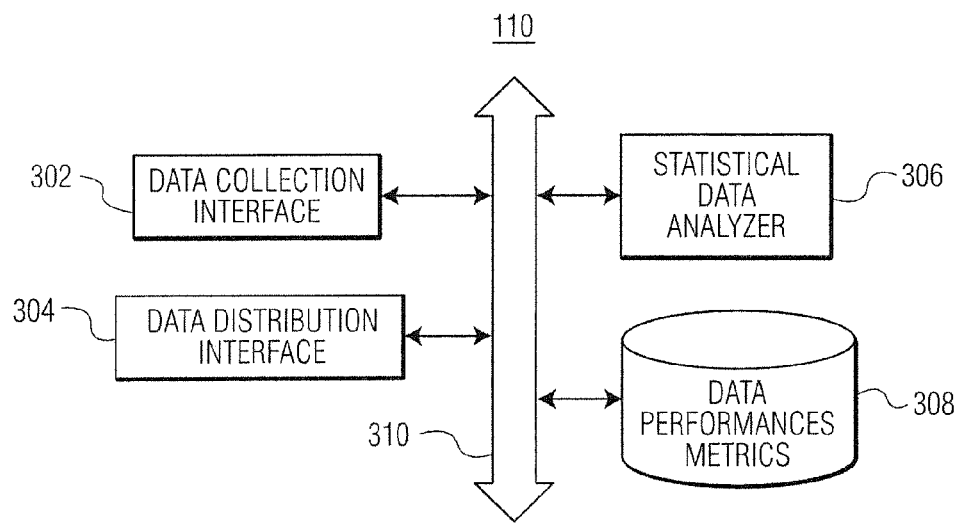
FIG. 3 is a functional block diagram of an example data performance system of a data conversion and distribution system according to an aspect of the present disclosure.

FIG. 3 is a functional block diagram of an exemplary data performance system 110, according to an aspect of the present disclosure. Data performance system 110 may include data collection interface 302, data distribution interface 304, statistical data analyzer 306 and data performance metrics database 308, which may communicate with each other via data and control bus 310. Although not shown, in some examples, data performance system 110 may include a controller (e.g., a processor, a microcontroller, a circuit, software and/or other hardware component(s)) specially configured to control operation of data collection interface 302, data distribution interface 304, statistical data analyzer 306 and data performance metrics database 308.

Data collection interface 302 may be configured to securely communicate with data communication system 108, to provide data performance system 110 access to the aggregated data in database 208, for determination of data performance metrics. Data distribution interface 304 may be configured to securely communicate with data distribution system 112, to provide data distribution system 112 with access to data performance metrics stored in database 308.

Statistical data analyzer 306 may be configured to query aggregated data database 208 (See FIG. 2) to retrieve at least a portion of the combined data for entries in database 208 associated with a predetermined category over a predetermined time period (e.g., 30 days), based on category and time indices of database 208. Statistical data analyzer 306 may be configured to execute one or more statistical processes (e.g., statistical modeling, algorithms, etc.) using the data value(s) and corresponding difference values for the entries to generate one or more performance metrics for the corresponding category (over the predetermined time period). Statistical data analyzer 306 may repeat this process for each predetermined category. In one example, statistical data analyzer 306 may compare transaction prices with corresponding difference values and determine percentile rankings for price differences (i.e., data performance metrics) in the predetermined category. In operation, statistical data analyzer 306 may perform the data performance analysis process periodically (e.g., once per day) and/or responsive to an event (e.g., issuance of new assets, credit rating changes, tender offers, etc.). In general, statistical data analyzer 306 may determine data performance metrics for one or more time periods.

Database 308 may be configured to store the data performance metrics associated with each predetermined time period. The data performance metrics may be indexed in database 308 according to each predetermined category and predetermined time period. In this manner, the indexing of data in database 308 based on category and time period may improve the efficiency of data retrieval for subsequent analysis by data distribution system 112.

Figure 4:
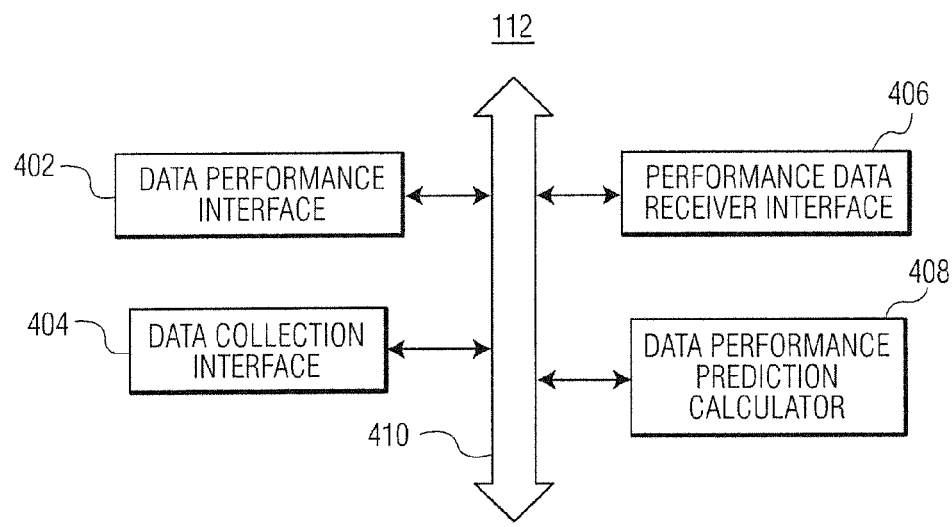
FIG. 4 is a functional block diagram of an example data distribution system of a data conversion and distribution system according to an aspect of the present disclosure.

FIG. 4 is a functional block diagram of an exemplary data distribution system 112, according to an aspect of the present disclosure. Data distribution system 112 may include data performance interface 402, data collection interface 404, performance data receiver interface 406 and data performance prediction calculator 408, which may communicate with each other via data and control bus 410. Although not shown, in some examples, data distribution system 112 may include a controller (e.g., a processor, a microcontroller, a circuit, software and/or other hardware component(s)) specially configured to control operation of data performance interface 402, data collection interface 404, performance data receiver interface 406 and data performance prediction calculator 408.

Data performance interface 402 may be configured to securely communicate with data performance system 110, to provide data distribution system 112 with access to data performance metrics stored in database 308, for determination of predictive performance metrics for a particular data set. Data collection interface 402 may be configured to securely communicate with data collection system 108, to provide data distribution system 112 access to the aggregated data in database 208 and/or historical data in database 218, for presentation of information to receivers 106. Performance data receiver interface 406 may be configured to securely communicate with performance data receivers (e.g., see performance data receivers 106 of FIG. 1) via a network (e.g., see network 114-2 of FIG. 1), to provide authorized receivers access to predictive performance metrics and/or other data/information associated with one or more data sets. Performance data receiver interface 406 may be configured to communicate with receivers 106 directly and/or via API(s) and/or application server(s).

Data performance prediction calculator 408 may be configured to receive request(s) for performance data from one or more receivers 106 (via interface 406) related to a particular data set (which may include a sparse data set). Calculator 408 may generate one or more predictive performance metrics for the particular data set based on a comparison of the particular data set to the data performance metrics stored in database 308.

In one example, calculator 408 may determine transaction information from the performance data request, based on information indicated in a user interface (of receiver 106), transaction information stored in a transaction file (stored at receiver 106 and/or stored at data collection system 108) or transaction information received from a source other than receive 106 or data collection system 108. Calculator 408 may retrieve data performance metric(s) (e.g., an execution quality) from database 308 based on one or more categories identified in the request. Calculator 408 may also identify and retrieve a benchmark price corresponding to the identified transaction information from history database 218 (FIG. 2). Calculator 408 may determine a transaction-specific difference between a transaction price (associated with the transaction information) and the benchmark price. Calculator 408 may then determine a percentile ranking corresponding to this difference from the retrieved performance metrics. In some examples, calculator 408 may convert the percentile ranking to a performance score, where a higher score may correspond to higher performance. For example, a transaction with a score of 75 may indicate that the transaction outperformed 75% of peer transactions in the category. The percentile ranking or score represents the predictive performance metric for the data set.

Data distribution system 112 may transmit the predictive performance data metric(s) to the requesting receiver 106, via performance data receiver interface 406. In one example, data distribution system 112 may generate a best execution score for particular transaction information that predicts the execution quality of the particular transaction, relative to the observed behavior provided by the transaction price distribution determined by data performance system 110.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, should be understood to be implemented by computer programs or equivalent electrical circuits, microcode, or the like. Furthermore, it has also proven convenient at times, to refer to these arrangements of operations as modules, without loss of generality. The described operations and their associated modules may be embodied in specialized software, firmware, specially-configured hardware or any combinations thereof.

Figure 5A:
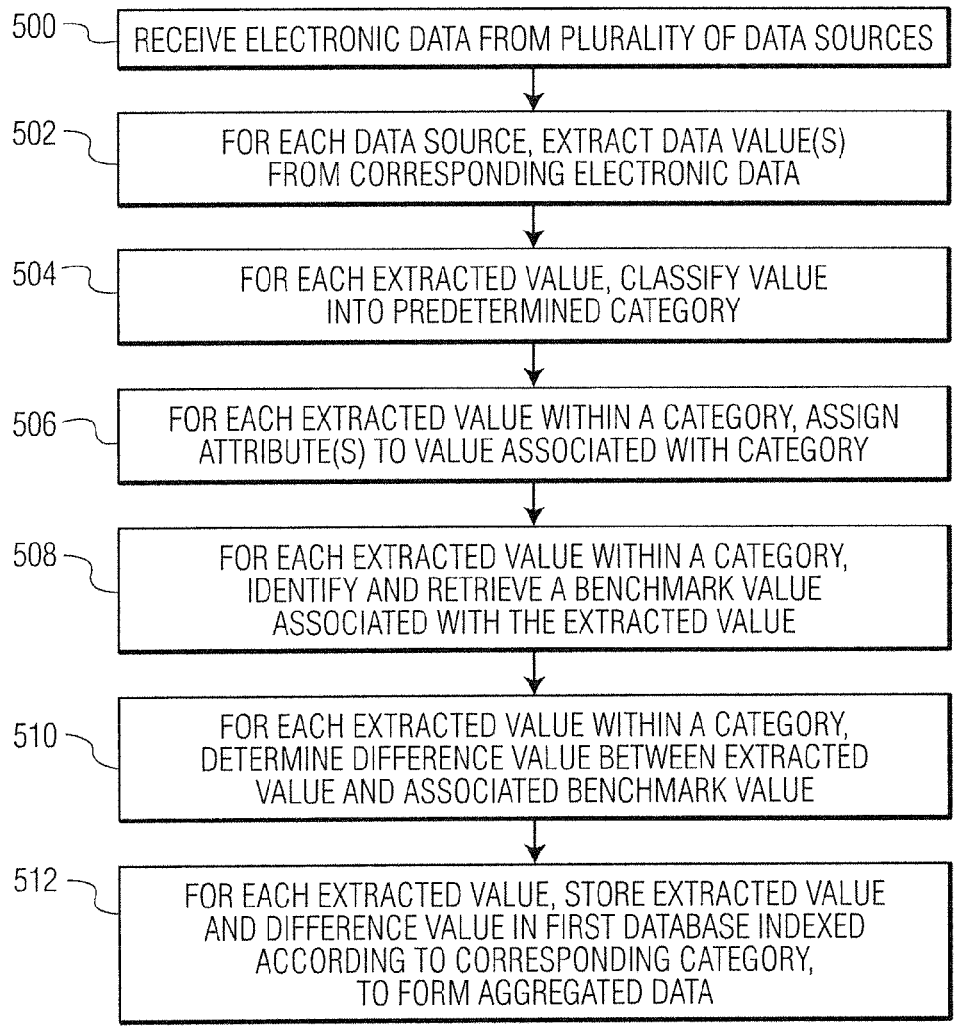
FIG. 5A is a flowchart diagram of an example method of creating an aggregated database of benchmarked-data values for the generation of data performance metrics associated with the electronic data exchange environment shown in FIG. 1, according to an aspect of the present disclosure.
Figure 5B:
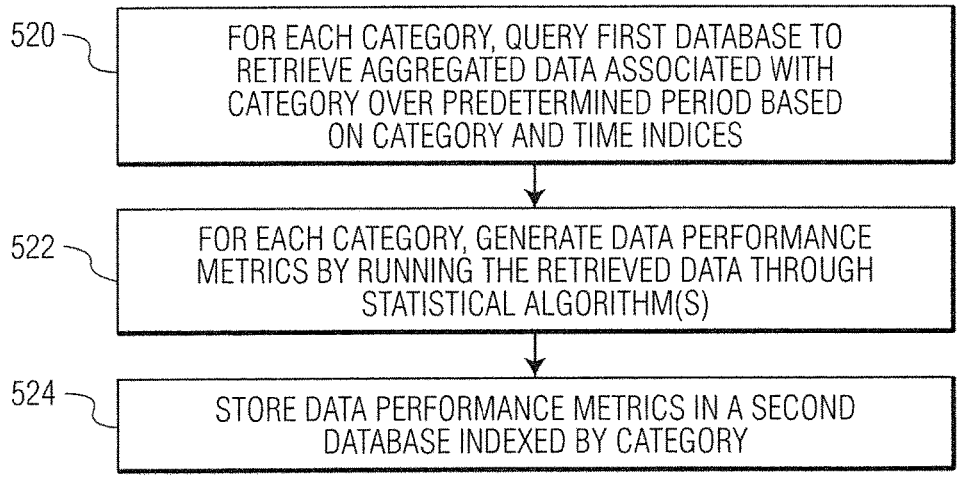
FIG. 5B is a flowchart diagram of an example method of generating data performance metrics associated with electronic data sources in the electronic data exchange environment shown in FIG. 1, according to an aspect of the present disclosure.
Figure 5C:
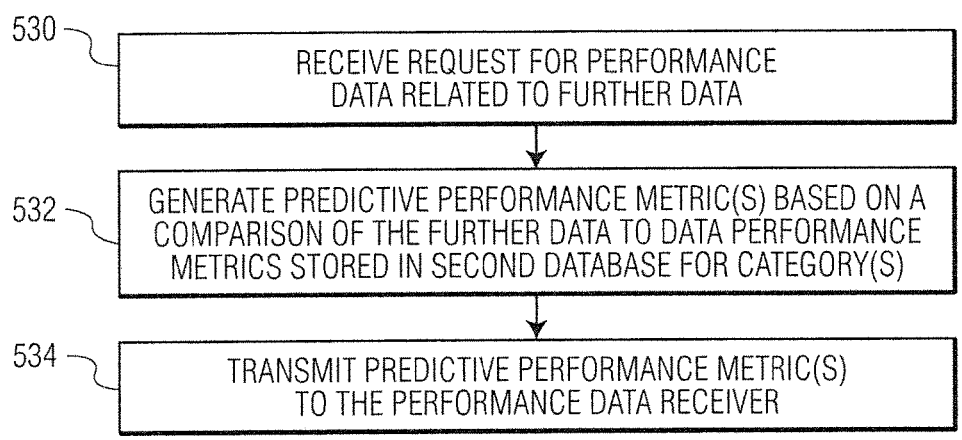
FIG. 5C is a flowchart diagram of an example method of generating predictive data performance metrics for particular electronic data based on the data performance metrics associated with the electronic data sources in the electronic data exchange environment shown in FIG. 1, according to an aspect of the present disclosure.

Those skilled in the art will appreciate that DCDS 104 (of FIG. 1) may be configured with more or less modules to conduct the methods described herein with reference to FIGS. 5A-5C. As illustrated in FIGS. 5A-5C, the methods shown may be performed by processing logic (e.g., such as processing logic 804 in FIG. 8) that may comprise hardware (e.g., circuitry, dedicated logic, programmable logic, microcode, etc.), software (such as instructions run on a processing device), or a combination thereof. In one embodiment, the methods shown in FIGS. 5A-5C may be performed by one or more specialized processing components associated with components 202-218 of data collection system 108 of FIG. 2, components 302-308 of data performance system 110 of FIG. 3 and components 402-408 of generator system 112 of FIG. 3.

FIGS. 5A-5C illustrate flowchart diagrams of exemplary methods of data conversion and distribution associated with the electronic data exchange environment 100 shown in FIG. 1, according to an aspect of the present disclosure. In particular, FIG. 5A is a flowchart diagram of an example method of creating an aggregated database of benchmarked-data values for the generation of data performance metrics; FIG. 5B is a flowchart diagram of an example method of generating data performance metrics; and FIG. 5C is a flowchart diagram of an example method of generating predictive data performance metrics for particular electronic data based on the data performance metrics.

FIGS. 5A-5C are described with reference to FIGS. 1-4. In this non-limiting example, it shall be assumed that the electronic data exchange environment 100 of FIG. 1 refers to an electronic asset exchange environment, and that all components and functions referenced with respect to FIGS. 5A-5C have been configured for functioning in that environment for purposes of this illustrative application. It should be understood, however, that the present disclosure is not limited to the exemplary implementation discussed with respect to FIGS. 5A-5C. To the contrary, as noted above, the data conversion and distribution technology discussed herein may be used in any data exchange environment.

Referring to FIG. 5A, at step 500, data collection system 108 may receive electronic data from each of data sources 102, e.g., via electronic communication over network 114-1. At step 502, data extractor 210 may, for each data source 102, extract one or more data values (as well as any associated information) from the corresponding received electronic data.

At step 504, data classifier 212 may classify each extracted value into one or more predetermined categories (e.g., based on the extracted value and/or associated information), and assign a classification indication to the extracted value (and associated information). At step 506, data classifier 212 may, for each extracted value within a category, assign one or more attributes to the extracted value based on predetermined attributes associated with the corresponding category (e.g., based on the extracted value and/or associated information), and may assign an attribute indication to the extracted value (and associated information).

At step 508, data benchmarker 214 may, for each extracted value within a category, identify and retrieve a benchmark value associated with the extracted value (e.g., from history database 218 and/or from among data sources 102). At step 510, data benchmarker 214 may, for each extracted value within the category, determine a difference value between the extracted value and the associated benchmark value.

At step 512, data mapper 216 may, for each extracted value, map corresponding combined information (e.g., the extracted value, the difference value, associated information) to one or more locations in database 208 such that the combined information is indexed according to the corresponding category, to form aggregated data for each predetermined category. Data mapper 216 may also, for each extracted value, store the combined information in database 208 such that the combined information is indexed according to various predetermined times. It should be understood that steps 500-512 may be repeated, for example, as additional electronic data is received from among data sources 102, on a periodic basis and/or responsive to an event.

Referring to FIG. 5B, at step 520, statistical data analyzer 306 may, for each category, query database 208 and retrieve aggregated data associated with the category over a predetermined time period. Statistical data analyzer 306 may perform the query based on a category index associated with the category and one or more time indices corresponding to the predetermined time period.

At step 522, statistical data analyzer 306 may, for each predetermined category, run the respective retrieved aggregated data through one or more statistical algorithms to generate one or more data performance metrics for the corresponding category. Because the aggregated data is representative of data from all of the data sources 102, the data performance metrics are representative of data from all of the data sources 102 associated with category for the predetermined time period.

At step 524, statistical data analyzer 306 may store the data performance metric(s) for each category in database 308 such that the data performance metrics are stored in one or more locations in database 308 indexed by category.

When authentication module 210 determines, at step 402, that a respective data entity 104 is not authorized, authentication module 210 may deny any data transfer (step 404) from the particular data entity 104. It should be understood that steps 520-524 may be repeated, for example, on a periodic basis and/or responsive to an event.

Referring to FIG. 5C, at step 530, data performance prediction calculator 408 may receive a request for performance data related to further data (i.e., a data set), from a receiver 106. For example, the request may be submitted to data distribution system 112 via a graphical user interface of a requesting receiver 106 over network 114-2. The request may indicate one or more categories for comparison of the further data. In some examples, the categories may be pre-set based on particular user preferences, such that the request may only indicate the particular requesting user.

At step 532, data performance prediction calculator 408 may generate one or more predictive performance metrics, based on a comparison of at least a portion of the further data to the data performance metrics stored in database 308 for the indicated category(s). For example, data performance prediction calculator 408 may compare the further data to the statistical profile of the overall data (from all data sources 102) and assess the percentile ranking for the further data's predicted performance.

At step 534, data performance prediction calculator 408 may transmit the predictive performance metric(s) to the requesting performance data receiver 106. Receiver 106 may display the predictive performance metrics in various forms, such as shown in example graphical user interface 700 (shown in FIG. 7).

One non-limiting example of a sparse electronic data set includes electronic transaction data associated with performance information such as execution quality metrics. Participants in such an industry (including portfolio managers, analysts, regulatory compliance teams, etc.) may seek performance information for assets such as execution quality metrics. However, in illiquid markets, directly observable data points relating to performance information may be scarce. For example, in some fixed income markets, less than 2% of issued instruments are a part of a transaction on a given day. As a result, directly observable data points relating to performance information is sparse, thereby forming a sparse data set.

In addition, there are existing regulations that require both buy-side and sell-side firms to implement best-execution policies for their transaction activities. However, implementation of these policies in the fixed income segment is challenging. In more liquid asset classes, such as equities and foreign exchange (FIX), it is possible to measure execution quality by comparing particular transactions to other transactions occurring in the market during the same period. Those involved in fixed income transactions often find that there is no other transaction activity going on for the bond they are buying or selling.

Accordingly, a data conversion and distribution system according to the current disclosure provides a solution for these types of data classes having sparse electronic data sets. As described above, the solution comes in the form of specially configured computer components, include a data collection system, a data performance system and a data distribution system that collectively, receive any amount of data originating from among a plurality of data sources, extract data values (and any associated information), determine difference values between the extracted data and a benchmark value, classify and map the combined information to form aggregated data, and run the aggregated data through statistical algorithms to generate statistical data for the sparse data classes.

In some examples, a data conversion and distribution system described herein may measure a difference between reported transaction prices and a concurrent independent continuous evaluated price (CEP) (i.e., a benchmark value) for transactions reported over a look-back period (for example, 20 days). The system may then calculate the distribution of these differences for a range of comparable transactions, as described below. From these distributions the system may create a "BestEx" score that reflects the quality of a particular transaction execution, relative to the observed behavior.

An example data conversion and distribution system may rely on a statistical analysis of a broad range of data collected from reliable market sources. Accordingly, a sparse asset class (an example of a sparse data class) such as a fixed income asset class may benefit from such a system. For example, the system may provide predictive performance metric(s) (e.g., execution quality) for transactions in the US Corporate Bond market. The same process can be applied to other fixed income asset classes, including but not limited to, US Agency debentures, to be announced mortgage-backed securities (TBA MBS), US Municipal bonds, and sovereign and corporate bonds in EMEA and Asia-Pacific (AsiaPac).

An example data conversion and distribution system according to the present disclosure may create an unbiased reference point used to measure the execution quality of an individual transaction or group of transactions. The system may be capable, for example, of calculating reference levels based upon a population of approximately 1 million transactions, broken down across transaction direction, transaction size group, maturity date group and credit quality. The system may generate, for example, an initial set of about 294 categories, and provides tools to efficiently calculate transaction execution quality scores for arbitrary set of transactions.

An example data conversion and distribution system according to the present disclosure may efficiently categorize, for example, assets with reportable transactions into a series of predetermined categories. This system may update and/or modify its data collection and/or performance analyses to handle market events, such as the issuance of new bonds, credit rating changes, tender offers, etc. For example, each of these corporate actions may impact transaction activity and/or the category assignments of the received electronic data.

For example, each month, between 700,000 and 900,000 US Corporate Bond transactions are reported by FINRA, covering approximately 20,000 unique securities. The volume of transaction data, extracting the reference data for each instrument involved in a transaction, constructing the cohorts and matching each transaction to the contemporaneous, independent evaluated price prevent this process from being performed manually.

Next, an example operation of a data conversion and distribution system is described with respect to the US corporate bond market. It should be understood that the example below is a non-limiting example.

The exemplary process begins by measuring the market-implied transaction costs, based upon reported transaction data over a period of 20 days, for example. A data collection system may then group the transactions by common attributes. For example, the data collection system may group the individual transactions into categories reflecting the maturity and credit quality of the bond and the type of transaction. The data collection system may also measure the difference between the reported transaction prices and the contemporaneous independent market price for each transaction in the category. The resulting differences may be stored in a first database for use by a data performance system. The categories may be further refined, using attributes such as industry sectors, bonds from the same issuer, and/or all transactions from a particular bond if more granular categories are desired. The grouping, difference measurement and storage may be repeated for any new categories reflecting any desired attributes.

The data performance system may create a statistical profile of the execution quality achieved across all transactions in each category. The profile(s) may capture the behavior of the market as a whole. The data performance system may select a set of price differences for a particular category, as determined by the data collection system and stored in the first database. The data performance system may perform a statistical analysis, to calculate a percentile distribution of the observed differences for each category. The results of the statistical analysis may be stored in a second database for use by a distribution system. The large set of categories and the number of transactions present in the many of categories necessitate the use of a specialized computer in order to produce reliable results within a meaningful timeframe.

The data distribution system may compare individual transactions to the statistical profile of the overall market, quantifying the performance with a "BestEx Score." The data distribution system may match specific transactions to the corresponding category and assess the percentile ranking for the transaction's estimated transaction cost. The score may represent the percentile rank of the selected transaction (e.g., a transaction with a score of "75" may refer to a transaction that outperformed 75% of the peer transactions in the selected cohort).

Tables 1-6 provide an example overview of transactions involving the US corporate bond market, as reported through FINRA's (TRACE). The data underlying these tables illustrates operation of an exemplary embodiment of the data collection and distribution system to provide execution quality metrics.

As shown in Tables 1-6, transactions are concentrated in the 5 year (5 Yr) and 10 year (10 Yr) sectors, with roughly 60% of the number of transactions and transaction volume being from these two segments. For the market as a whole, just over 86% of all transaction volume (estimated) occurs in blocks of $1 Million or more. For the 10 Yr sector, the proportion is just over 87%, and for the 5 yr sector, the proportion is just over 85%.

TABLE 1

Number of transactions by tenor in June 2015
Number of transactions by tenor

| Tenor | Dealer Buy | InterDealer | Dealer Sell | Total |
|---|---|---|---|---|
| 30 Yr | 32,655 | 42,400 | 50,017 | 125,072 |
| 10 Yr | 68,802 | 95,464 | 104,957 | 269,223 |
| 7 Yr | 1,217 | 2,287 | 2,538 | 6,042 |
| 5 Yr | 69,632 | 94,100 | 99,209 | 262,941 |
| 3 Yr | 22,729 | 28,299 | 27,028 | 78,056 |
| 2 YR | 27,192 | 31,440 | 27,609 | 86,241 |
| Short | 23 | 1 | 12 | 36 |
| NoBench | 20,146 | 18,932 | 20,129 | 59,207 |
| Total | 242,396 | 312,923 | 331,499 | 886,818 |

TABLE 2

Estimated volume by tenor for transactions in June 2015
Estimated Volume by tenor (millions)

| Tenor | Dealer Buy | InterDealer | Dealer Sell | Total |
|---|---|---|---|---|
| 30 Yr | 38,572 | 17,113 | 40,617 | 96,302 |
| 10 Yr | 73,806 | 38,666 | 74,944 | 187,416 |
| 7 Yr | 1,879 | 1,104 | 1,963 | 4,946 |
| 5 Yr | 60,152 | 28,989 | 61,845 | 150,986 |
| 3 Yr | 16,144 | 6,112 | 16,616 | 38,872 |
| 2 YR | 17,346 | 6,493 | 17,603 | 41,441 |
| Short | 40 | 4 | 43 | 87 |
| NoBench | 17,709 | 7,149 | 19,489 | 44,346 |
| Total | 225,646 | 105,629 | 233,120 | 564,396 |

TABLE 3

Estimated volume by transaction size for transactions in June 2015
Estimated Volume by tenor (millions) all tenors

| Transaction Size | Dealer Buy | InterDealer | Dealer Sell | Total |
|---|---|---|---|---|
| 1) 5 MM+ | 86,859 | 20,251 | 82,473 | 189,582 |
| 2) 1 MM-5 MM | 114,833 | 61,223 | 120,855 | 296,910 |
| 3) 500K-1 MM | 10,945 | 9,429 | 11,894 | 32,268 |
| 4) 250K-500K | 5,783 | 5,075 | 6,997 | 17,855 |
| 5) 100K-250K | 4,616 | 5,040 | 6,437 | 16,093 |
| 6) 25K-100K | 1,861 | 3,213 | 3,254 | 8,328 |
| 7) <25K | 750 | 1,399 | 1,211 | 3,360 |
| Total | 225,646 | 105,629 | 233,120 | 564,396 |

TABLE 4

Estimated volume by transaction size in June 2015
Estimated Volume by transaction size (millions) 10 yr tenor

| Transaction Size | Dealer Buy | InterDealer | Dealer Sell | Total |
|---|---|---|---|---|
| 1) 5 MM+ | 25,054 | 6,651 | 22,952 | 54,656 |
| 2) 1 MM-5 MM | 41,659 | 24,052 | 42,955 | 108,667 |
| 3) 500K-1 MM | 3,389 | 3,343 | 3,560 | 10,292 |
| 4) 250K-500K | 1,708 | 1,642 | 2,074 | 5,423 |
| 5) 100K-250K | 1,327 | 1,597 | 1,969 | 4,893 |
| 6) 25K-100K | 477 | 978 | 1,034 | 2,489 |
| 7) <25K | 193 | 403 | 400 | 996 |
| Total | 73,806 | 38,666 | 74,944 | 187,416 |

TABLE 5

Number of transactions by transaction size in June 2015
Number of transactions by transaction size-All tenors

| Transaction Size | Dealer Buy | InterDealer | Dealer Sell | Total |
|---|---|---|---|---|
| 1) 5 MM+ | 9,169 | 2,214 | 9,001 | 20,384 |
| 2) 1 MM-5 MM | 43,066 | 27,563 | 46,431 | 117,060 |
| 3) 500K-1 MM | 17,338 | 15,856 | 19,135 | 52,329 |
| 4) 250K-500K | 17,560 | 16,085 | 21,664 | 55,309 |
| 5) 100K-250K | 30,359 | 35,077 | 43,504 | 108,940 |
| 6) 25K-100K | 41,845 | 75,190 | 76,409 | 193,444 |
| 7) <25K | 83,059 | 140,938 | 115,355 | 339,352 |
| Total | 242,396 | 312,923 | 331,499 | 886,818 |

TABLE 6

Number of transactions by transaction size in June 2015
Number of transactions by transaction size-10 Yr Tenor

| Transaction Size | Dealer Buy | InterDealer | Dealer Sell | Total |
|---|---|---|---|---|
| 1) 5 MM+ | 2,681 | 744 | 2,542 | 5,967 |
| 2) 1 MM-5 MM | 14,862 | 10,417 | 15,615 | 40,894 |
| 3) 500K-1 MM | 5,414 | 5,680 | 5,745 | 16,839 |
| 4) 250K-500K | 5,178 | 5,233 | 6,396 | 16,807 |
| 5) 100K-250K | 8,386 | 10,854 | 13,031 | 32,271 |
| 6) 25K-100K | 10,650 | 22,748 | 24,598 | 57,996 |
| 7) <25K | 21,631 | 39,788 | 37,030 | 98,449 |
| Total | 68,802 | 95,464 | 104,957 | 269,223 |

Figure 6A:
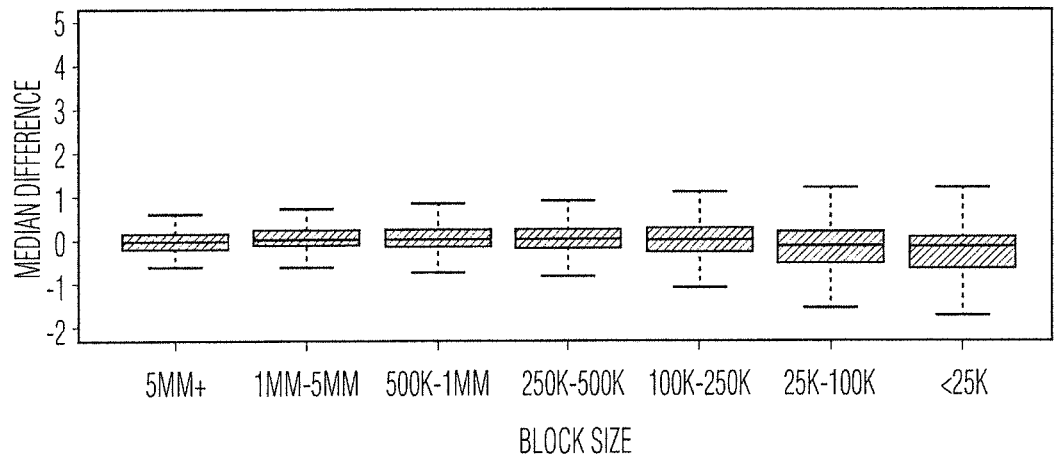
FIGS. 6A and 6B are example data distribution diagrams for generating data performance metrics, according to an aspect of the present disclosure.
Figure 6B:
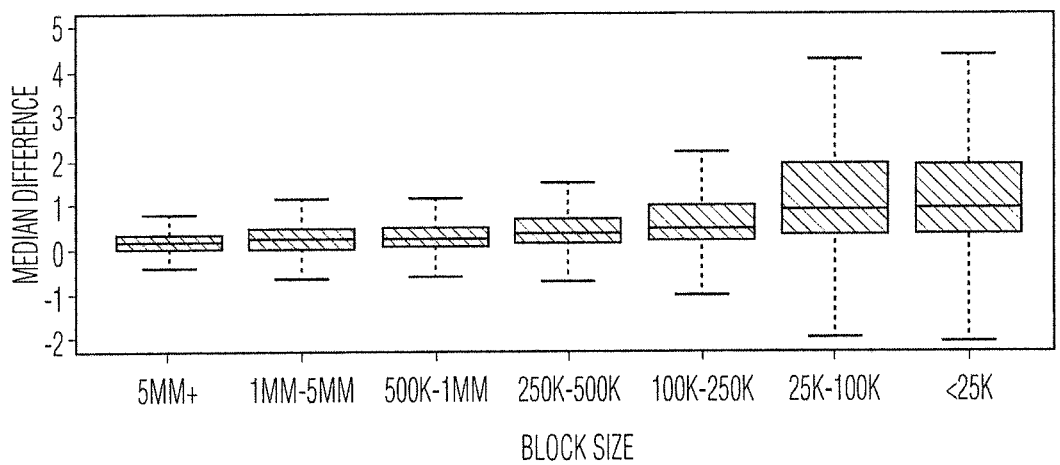

For 68,802 Dealer Buy transactions and 104,957 Dealer Sell transactions, the data performance system may examine the distribution of the transaction price/reference price differences described above, using, for example, a box plot (shown in FIGS. 6A and 6B). FIGS. 6A and 6B illustrate median differences as a function of block size for the 10 year sector. FIG. 6A illustrates a distribution of differences for dealer buy transactions in June 2015. FIG. 6B illustrates a distribution of differences for dealer sell transactions in June 2015. The hashed area shows the range for the middle 50% of observations for each category. In FIG. 6A, the ranges for the larger, dealer buy transactions are quite concentrated.

The data performance system may capture the percentile rankings that are used to measure the execution quality of individual transactions (i.e., the BestEx score). The percentile rankings are shown below in Tables 7 and 8 for dealer buy transactions (Table 7) and dealer sell transactions (Table 8).

TABLE 7

Market Performance Percentile (% tile) Rankings for Dealer Buys
Dealer Buys Block

| % tile | 5 MM | 1 MM-5 MM | 500K-1 MM | 250K-500K | 100K-250K | 25K-100K | <25K |
|---|---|---|---|---|---|---|---|
| 1% | −1.044 | −1.213 | −1.342 | −1.629 | −2.492 | −3.506 | −4.380 |
| 5% | −0.534 | −0.538 | −0.693 | −0.787 | −1.125 | −1.708 | −2.300 |
| 10% | −0.358 | −0.337 | −0.437 | −0.500 | −0.725 | −1.134 | −1.482 |
| 15% | −0.252 | −0.250 | −0.261 | −0.325 | −0.500 | −0.874 | −1.056 |
| 20% | −0.190 | −0.136 | −0.200 | −0.250 | −0.367 | −0.665 | −0.796 |
| 25% | −0.147 | −0.095 | −0.125 | −0.161 | −0.250 | −0.500 | −0.616 |
| 30% | −0.114 | −0.018 | −0.061 | −0.101 | −0.176 | −0.400 | −0.479 |
| 35% | −0.075 | 0.000 | −0.007 | −0.048 | −0.112 | −0.290 | −0.364 |

TABLE 7-continued

Market Performance Percentile (% tile) Rankings for Dealer Buys Dealer Buys Block

| % tile | 5 MM | 1 MM-5 MM | 500K-1 MM | 250K-500K | 100K-250K | 25K-100K | <25K |
|---|---|---|---|---|---|---|---|
| 40% | −0.046 | 0.000 | 0.000 | 0.000 | −0.038 | −0.219 | −0.261 |
| 45% | −0.016 | 0.000 | 0.004 | 0.000 | 0.000 | −0.141 | −0.199 |
| 50% | 0.003 | 0.050 | 0.050 | 0.041 | 0.027 | −0.089 | −0.128 |
| 55% | 0.029 | 0.121 | 0.100 | 0.088 | 0.075 | −0.019 | −0.094 |
| 60% | 0.063 | 0.125 | 0.141 | 0.130 | 0.126 | 0.010 | −0.037 |
| 65% | 0.093 | 0.212 | 0.202 | 0.190 | 0.188 | 0.060 | 0.000 |
| 70% | 0.125 | 0.250 | 0.250 | 0.250 | 0.250 | 0.125 | 0.047 |
| 75% | 0.163 | 0.250 | 0.273 | 0.277 | 0.300 | 0.198 | 0.109 |
| 80% | 0.206 | 0.350 | 0.375 | 0.365 | 0.384 | 0.260 | 0.182 |
| 85% | 0.250 | 0.441 | 0.480 | 0.471 | 0.500 | 0.375 | 0.279 |
| 90% | 0.320 | 0.500 | 0.500 | 0.559 | 0.625 | 0.521 | 0.424 |
| 95% | 0.427 | 0.750 | 0.750 | 0.800 | 0.932 | 0.871 | 0.753 |
| 99% | 0.878 | 1.250 | 1.259 | 1.583 | 1.750 | 2.101 | 2.150 |

TABLE 8

Market Performance Percentile (% tile) Rankings for Dealer Sells Dealer Sells Block

| % tile | 5 MM | 1 MM-5 MM | 500K-1 MM | 250K-500K | 100K-250K | 25K-100K | <25K |
|---|---|---|---|---|---|---|---|
| 1% | −0.614 | −0.853 | −0.905 | −0.801 | −0.879 | −0.578 | −0.818 |
| 5% | −0.250 | −0.250 | −0.250 | −0.250 | −0.220 | −0.043 | −0.042 |
| 10% | −0.116 | −0.063 | −0.064 | −0.056 | −0.015 | 0.100 | 0.105 |
| 15% | −0.038 | 0.000 | 0.000 | 0.000 | 0.050 | 0.191 | 0.179 |
| 20% | 0.000 | 0.000 | 0.000 | 0.063 | 0.125 | 0.254 | 0.254 |
| 25% | 0.034 | 0.026 | 0.055 | 0.125 | 0.190 | 0.332 | 0.339 |
| 30% | 0.071 | 0.101 | 0.112 | 0.177 | 0.246 | 0.405 | 0.425 |
| 35% | 0.101 | 0.125 | 0.155 | 0.223 | 0.279 | 0.490 | 0.505 |
| 40% | 0.127 | 0.188 | 0.200 | 0.250 | 0.337 | 0.579 | 0.614 |
| 45% | 0.154 | 0.250 | 0.250 | 0.298 | 0.393 | 0.718 | 0.750 |
| 50% | 0.180 | 0.250 | 0.251 | 0.350 | 0.466 | 0.890 | 0.925 |
| 55% | 0.215 | 0.250 | 0.310 | 0.389 | 0.504 | 1.100 | 1.127 |
| 60% | 0.243 | 0.274 | 0.370 | 0.457 | 0.615 | 1.317 | 1.363 |
| 65% | 0.266 | 0.343 | 0.414 | 0.500 | 0.740 | 1.527 | 1.562 |
| 70% | 0.300 | 0.375 | 0.494 | 0.564 | 0.850 | 1.733 | 1.749 |
| 75% | 0.338 | 0.478 | 0.500 | 0.670 | 1.000 | 1.912 | 1.950 |
| 80% | 0.376 | 0.500 | 0.605 | 0.750 | 1.250 | 2.098 | 2.167 |
| 85% | 0.424 | 0.600 | 0.730 | 0.942 | 1.508 | 2.310 | 2.417 |
| 90% | 0.489 | 0.750 | 0.875 | 1.146 | 1.850 | 2.570 | 2.737 |
| 95% | 0.608 | 0.950 | 1.200 | 1.578 | 2.289 | 3.000 | 3.225 |
| 99% | 0.904 | 1.513 | 2.00 | 2.568 | 3.239 | 4.300 | 4 741 |

The data distribution system may determine a execution quality score (BestEx) score for individual transactions, based on the percentile rankings shown in Tables 7 and 8. Table 9 below displays five sample transactions for the 10 year maturity sector. The last three columns show the mapping to the block size category, the observed difference between the reported transaction price and the contemporaneous reference price and the resulting BestEx score. In this example, CUSIP transaction identifier 06051GEU has the highest BestEx score whereas CUSIP transaction identifier 40414LAN has a lowest score.

TABLE 9

Example Transactions with BestEx Score

| CUSIP | Issuer | Issue | Transaction Size | Transaction Price | Ref. Price | Block Size | Diff. | Score |
|---|---|---|---|---|---|---|---|---|
| 472319AL | JEFFERIES GROUP INC NEW | SR NT 5.125%23 | 80,000 | 104.347 | 102.307 | 25K-100K | 2.040 | 22 |
| 404119BQ | HCA INC | SR SEC NT5.25%25 | 35,000 | 105.600 | 105.275 | 25K-100K | 0.325 | 76 |
| 40414LAN | HCP INC | SR NT4%25 | 500,000 | 99.385 | 97.857 | 250K-500K | 1.528 | 6 |
| 06051GEU | BANK AMER CORP | FR 3.3%01123 | 10,000 | 98.421 | 98.440 | 25K-100K | −0.019 | 93 |
| 04021LAA | ARGOS MERGER SUB INC | SR GLBL 144A23 | 3,591,000 | 105.750 | 105.313 | 1 MM-5 MM | 0.438 | 27 |

FIG. 7 illustrates an exemplary graphical user interface (GUI) 700 which may be provided on a display of one or more receivers 106. In some examples, GUI 700 may be present on a webpage accessed by a user of receiver 106. GUI 700 illustrates an example interface for calculation of execution quality scores for fixed income instruments. It should be understood that FIG. 7 represents a non-limiting example user interface, and that a similar interface may be provided for providing predictive performance metrics for any data class.

GUI 700 may include a section displaying instrument information 702 including, for example, the asset title, a brief description, and the like. GUI 700 may also contain means for providing feedback to an operator of the data conversion and distribution system, such as via feedback icon 704. Selection of the feedback icon 707 by the user may, for example, provide a pop-up window, link to a new tab or webpage, and the like which allows for communication with DCDS 104 for data conversion and distribution. Alternatively, hovering over the feedback icon 704 with a mouse, may display a phone number, email address, or chat service configured to aid in communication between the user of receiver 106 and an operator of DCDS 100.

GUI 700 may include one or more tabs 706 used to change the panels displayed in the GUI window. Tabs 706 may include any desired tabs appropriate for the particular implementation. A selected tab may change color in order indicate to a user selection of the tab. Other panels displayed on the GUI window may be adjusted in accordance with the selected tab 706.

In the displayed embodiment, selection of BestEx tab 706A displays at least three panels: Best Ex score panel 708, Best Ex calculator panel 710 and Median Markup/Markdown panel 712. It should be understood that additional or fewer panels may be visible upon selecting Best Ex tab 706A. GUI 700 may also display information regarding the date at which data and information displayed in the GUI 700 was last updated. In the particular example, GUI 700 displays an example of the BestEx Scoring analysis for a particular asset (6.55%), maturing on Sep. 15, 2043.

Best Ex panel 710 may include information regarding execution quality (Best Ex) scores for various categories (e.g., 708A) of a particular asset when compared with the distribution of similar transactions in the category, separated by category. For example, subpanel 708A shows the BestEx Score (49) computed for this transaction, based upon the distribution of all similar transactions (Dealer Sells, for all 30 Yr, investment grade bonds). The transaction price differs from the current CEP by 0.312. The value of the BestEx Score indicates that 49% of all transactions had a larger price difference (i.e., 49% of buyers of this type of bond had a higher transaction cost). Categories may also include sector, issuer and bond.

Best Ex calculator panel 712 may include information regarding calculation of the execution quality score for the asset. Subpanel 710A allows for user input of size and/or price information for both transaction sides (dealer sell and dealer buy). Although textboxes configured for user input are depicted in subpanel 710A, alternate methods for receiving user input may be used, such as a scrollbar, selectable drop-down menu, and the like. Subpanel 710B shows the CEP at the time of the transaction, here defined as a "Dealer Sell" for a principal amount of $1,500,000, at a price of 117.400. The current CEP price (117.088). Calculation button 710C allows for calculation of the Best Ex score according to the values indicted in subpanel 710A. Subpanel 710D provides a graphical and/or numerical display of Best Ex score for various prices, including the price information input into subpanel 710A. In one embodiment, selection of the calculation button 710C may update the other panels and subpanels of the Best Ex tab 706A.

The Median Markup/Markdown panel 712 may display information regarding the asset's score in the context of "market norms" for this category. In this example, subpanel 712A illustrates the markup/markdown information in a graphical format. Bars 714 show the median markup for each of seven transaction size ranges. Diamond 716 represents the transaction being evaluated. Line 718 shows the level corresponding to a BestEx score of 30. Legend 712B shows the values associated with the median markup and the markup corresponding to a selected threshold.

Although exemplary sections and panels are depicted in FIG. 7, alternate configurations for the sections and panels are envisioned. For example, a graphical user interface may contain more or fewer sections and panels. Additionally, the sections and panels may be reorganized in any manner and display other pertinent information.

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, personal computers (PCs), mobile devices, and other terms. It should be understood that those terms used herein are interchangeable, and any special purpose computer capable of performing the described functions may be used.

Computers may be linked to one another via one or more networks. A network may be any plurality of completely or partially interconnected computers wherein some or all of the computers are able to communicate with one another. Connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

In some non-limiting implementations, the data exchange system described herein may refer to an electronic exchange system. In such implementations, a the data collection system may receive electronic data related to transaction price data and information associated with one or more assets, as well as independent market price data associated with other assets at one or more times. A first database having aggregated data may store transaction data and associated information for one or more assets, including transaction price data associated with asset(s) involved in transactions at particular time(s). A second database may store benchmark data values including independent market prices associated with assets in one or more particular categories at one or more times. A third database having data performance metrics may store a statistical profile of execution quality achieved across assets within a predetermined category (across the marketplace) over a predetermined period of time. The data performance system may determine the statistical profile of execution quality based on a difference between reported transaction prices and a contemporaneous independent market price for each transaction in the category. The data distribution system may determine predictive performance metric(s) for further electronic data including an execution quality score(s) for one or more transaction data sets based on assessment of the transaction data set(s) with respect to the statistical profile representing all assets (involved in transactions) within one or more categories. The execution quality score(s) may represent percentile rank(s) of estimated transaction cost(s) of the transaction data set(s).

The systems and methods described herein are effective for use in connection with all types of asset classes, including with fixed income asset classes. However, and solely for exemplary and illustrative purposes, aspects of the present disclosure are described in the context of fixed income asset classes.

The term "computer" shall refer to any electronic device or devices, including those having capabilities to be utilized in connection with an electronic exchange system, such as any device specifically configured in accordance with this disclosure and capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with an electronic data exchange system and the data conversion and distribution system described herein, such as, for example, any public and/or private networks, including, for instance, the Internet, an intranet, or an extranet, any wired or wireless networks or combinations thereof.

The terms "data source," "electronic exchange server", "electronic data exchange" and "electronic exchange system" may be used interchangeably and shall refer to any type of a computing device, system or venue that is specifically configured according to this disclosure and capable of carrying out electronic data exchanges. For example, an electronic exchange system may refer to a simple data transfer/exchange system or, in one particular non-limiting implementation, to an electronic asset exchange system or device such as a commodities exchange, a futures execution facility, an options exchange, a cash equities exchange, a swap execution facility, an unregulated electronic transaction execution venue or any other type of an exchange venue known in the art. The electronic exchange server may comprise one or more processors configured to execute instructions stored in a non-transitory memory (such as shown in FIG. 8). The electronic exchange server may be configured to place orders in connection with assets over a network when the instructions are executed. An electronic exchange server may be embodied on a single computing device, while in other embodiments, an electronic exchange server may refer to a plurality of computing devices housed in one or more facilities that are configured to jointly provide local or remote computing services to one or more users or user devices. The electronic exchange server may send and receive data from user devices, data servers, or any other type of computing devices or entities over the Internet, over a Wi-Fi connection, over a cellular network or via any other wired or wireless connection or network known in the art.

The term "asset" shall include any type of good or service, including instruments of any type or class, such as, without limitation, outright options, spread options, option combinations, commodities, derivatives, shares, bonds and currencies. The term "derivatives" shall further refer to any type of options, caps, floors, collars, structured debt obligations and deposits, swaps, futures, forwards and various combinations thereof or any other type of instruments that derive from another underlying instrument.

The term "trade" or "transaction" shall refer to any type or part of offer, purchase, sale and/or exchange that may occur in connection with one or more assets.

The term "product" may be broadly construed to comprise any type of asset including, without limitation, commodities, derivatives, shares, bonds, and currencies. Derivatives, for example, should also be broadly construed to comprise (without limitation) any type of options, caps, floors, collars, structured debt obligations and deposits, swaps, futures, forwards, and various combinations thereof.

FIG. 8 illustrates a functional block diagram of a machine in the example form of computer system 800 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, DCDS 104 (FIG. 1) may be implemented by the example machine shown in FIG. 8 (or a combination of two or more of such machines).

Example computer system 800 may include processing device 802, memory 806, data storage device 810 and communication interface 812, which may communicate with each other via data and control bus 818. In some examples, computer system 800 may also include display device 814 and/or user interface 816.

Processing device 802 may include, without being limited to, a microprocessor, a central processing unit, an application specific integrated circuit (ASIC), a field programmable gate array (FPGA), a digital signal processor (DSP) and/or a network processor. Processing device 802 may be configured to execute processing logic 804 for performing the operations described herein. In general, processing device 802 may include any suitable special-purpose processing device specially programmed with processing logic 804 to perform the operations described herein.

Memory 806 may include, for example, without being limited to, at least one of a read-only memory (ROM), a random access memory (RAM), a flash memory, a dynamic RAM (DRAM) and a static RAM (SRAM), storing computer-readable instructions 808 executable by processing device 802. In general, memory 806 may include any suitable non-transitory computer readable storage medium storing computer-readable instructions 808 executable by processing device 802 for performing the operations described herein. Although one memory device 808 is illustrated in FIG. 8, in some examples, computer system 800 may include two or more memory devices (e.g., dynamic memory and static memory).

Computer system 800 may include communication interface device 812, for direct communication with other computers (including wired and/or wireless communication) and/or for communication with network(s) 114 (FIG. 1). In some examples, computer system 800 may include display device 814 (e.g., a liquid crystal display (LCD), a touch sensitive display, etc.). In some examples, computer system 800 may include user interface 816 (e.g., an alphanumeric input device, a cursor control device, etc.).

In some examples, computer system 800 may include data storage device 810 storing instructions (e.g., software) for performing any one or more of the functions described herein. Data storage device 810 may include any suitable non-transitory computer-readable storage medium, including, without being limited to, solid-state memories, optical media and magnetic media.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A data conversion and distribution system comprising:
a data collection system configured to:
   receive electronic data from each of a plurality of electronic data sources via electronic communication over a network, said electronic data comprising real-time market data,
   extract, for each electronic data source, one or more data values from the corresponding received electronic data,
   classify, for each extracted data value from each electronic data source, the extracted data value among one or more predetermined categories, and
   store each extracted data value from each electronic data source in a first database according to a data mapping based on a category index corresponding to each predetermined category, such that the respective extracted data value is stored according to the category index associated with the corresponding classified category;
a data performance system communicatively coupled to the data collection system, the data performance system configured to:
   retrieve, from the first database, for each predetermined category, stored data values associated with the respective predetermined category and a predetermined time period, by querying the first database based on the respective category index, and
   run, for each predetermined category, the respective retrieved data through one or more statistical algorithms, to generate data performance metrics for the respective predetermined category representative of the electronic data from all of the plurality of electronic data sources, wherein the data performance metrics include a statistical profile representative of data execution quality for all retrieved data values in the corresponding predetermined category; and
a data distribution system communicatively coupled to the data collection system and the data performance system, the data distribution system configured to:
   generate a predictive performance metric for further electronic data based on a comparison of the further electronic data to the data performance metrics for at least one of the one or more predetermined categories, wherein the data collection system, the data performance system and the data distribution system comprise one or more computers.

2. The system of claim 1, wherein the electronic data received from each electronic data source includes at least one of one or more electronic data feeds, one or more electronic data files, one or more emails, and one or more text messages.

3. The system of claim 1, wherein the data collection system is configured to assign a classification indication to each classified data value corresponding to the classified category, and map the corresponding classified data value to one or more locations of the first database based on the respective classification indication.

4. The system of claim 1, wherein the data collection system is configured to further classify, for at least one of the classified values, the classified value among one or more predetermined attributes associated with the classified predetermined category.

5. The system of claim 1, wherein the data collection system is configured to at least one of authenticate each data source and validate at least a portion of the received electronic data.

6. The system of claim 1, wherein the data collection system is configured to receive, from among the plurality of electronic data sources, one or more benchmark data values and store the received one or more benchmark data values in a second database.

7. The system of claim 6, wherein the second database is further configured to store historical data.

8. The system of claim 7, wherein the data distribution system is configured to generate the predictive performance metric responsive to a request for performance information received from a receiver device and is configured to transmit, to the receiver device, at least one of the predictive performance metric and other data associated with the further electronic data corresponding to one or more values stored in the second database.

9. The system of claim 6, wherein:
the data classification system is further configured to determine, for each classified data value, a difference value between the classified data value and a benchmark data value among the one or more benchmark data values stored in the second database, and store the associated difference value in the first database with the corresponding extracted data value, and
the data performance system is configured to retrieve, for each predetermined category, each corresponding stored difference value from the first database associated with the respective predetermined category and a predetermined time period and generate the data performance metrics for the respective predetermined category based on each retrieved difference value.

10. The system of claim 1, wherein the data performance metrics represent a transaction price distribution for price differences for a range of transactions in the respective predetermined category.

11. The system of claim 6, wherein the electronic data includes transaction data associated with one or more assets, and the one or more benchmark data values includes reference price data.

12. A method for data conversion and distribution, the method comprising:
receiving, by a data collection system, electronic data from each of a plurality of electronic data sources via electronic communication over a network, said electronic data comprising real-time market data;

extracting by the data collection system, for each electronic data source, one or more data values from the corresponding received electronic data;

classifying, by the data collection system, for each extracted data value from each electronic data source, the extracted data value among one or more predetermined categories;

storing, by the data collection system, each extracted data value from each electronic data source in a first database according to a data mapping based on a category index corresponding to each predetermined category, such that the respective extracted data value is stored according to the category index associated with the corresponding classified category;

retrieving, by a data performance system, from the first database, for each predetermined category, stored data values associated with the respective predetermined category and a predetermined time period, by querying the first database based on the respective category index;

running, by the data performance system, for each predetermined category, the respective retrieved data through one or more statistical algorithms, to generate data performance metrics for the respective predetermined category representative of the electronic data from all of the plurality of electronic data sources, wherein the data performance metrics include a statistical profile representative of data execution quality for all retrieved data values in the corresponding predetermined category; and generating, by a data distribution system, a predictive performance metric for further electronic data based on a comparison of the further electronic data to the data performance metrics for at least one of the one or more predetermined categories, wherein the data collection system, the data performance system and the data distribution system comprise one or more computers.

13. The method of claim 12, wherein the classifying of the extracted data further includes assigning a classification indication to each classified data value corresponding to the classified category, and map the corresponding classified data value to one or more locations of the first database based on the respective classification indication.

14. The method of claim 12, wherein the classifying of the extracted data further includes classifying, for at least one of the classified values, the classified value among one or more predetermined attributes associated with the classified predetermined category.

15. The method of claim 12, the method further comprising:
retrieving, by the data classification system, for each classified data value, a benchmark data value from among one or more benchmark data values stored in a second database corresponding to the classified data value;
generating, for each classified data value, a difference value between the classified data value and the respective retrieved benchmark data value; and
store the associated difference value in the first database with the corresponding extracted data value.

16. The method of claim 15, wherein:
the retrieving of the stored data values includes retrieving, for each predetermined category, each corresponding stored difference value from the first database associated with the respective predetermined category and a predetermined time period, and the running of the respective retrieved data includes running for each predetermined category, each corresponding retrieved difference value through the one or more statistical algorithms to generate the respective data performance metrics.

17. The method of claim 16, wherein the generating of the predictive performance metric includes determining a further difference value between the further electronic data and a further benchmark value corresponding to the further electronic data and comparing the further difference value to the data performance metrics for the at least one of the one or more predetermined categories to identify the predictive performance metric for the further electronic data.

18. The method of claim 12, wherein the data performance metrics represent a transaction price distribution for price differences for a range of transactions in the respective predetermined category.

19. A non-transitory computer-readable storage medium programmed to include instructions that, when executed by one or more processing devices, cause the one or more processing devices to perform functions including:
causing a data collection system to:
receive electronic data from each of a plurality of electronic data sources via electronic communication over a network, said electronic data comprising real-time market data;
extract, for each electronic data source, one or more data values from the corresponding received electronic data;
classify, for each extracted data value from each electronic data source, the extracted data value among one or more predetermined categories, and
store each extracted data value from each electronic data source in a first database according to a data mapping based on a category index corresponding to each predetermined category, such that the respective extracted data value is stored according to the category index associated with the corresponding classified category;
causing a data performance system to:
retrieve, from the first database, for each predetermined category, stored data values associated with the respective predetermined category and a predetermined time period, by querying the first database based on the respective category index, and
run, for each predetermined category, the respective retrieved data through one or more statistical algorithms, to generate data performance metrics for the respective predetermined category representative of the electronic data from all of the plurality of electronic data sources, wherein the data performance metrics include a statistical profile representative of data execution quality for all retrieved data values in the corresponding predetermined category; and
cause a data distribution system to:
generate a predictive performance metric for further electronic data based on a comparison of the further electronic data to the data performance metrics for at least one of the one or more predetermined categories.

20. The non-transitory computer-readable storage medium of claim 19, wherein the instructions include further instructions that cause the data collection system to:
retrieve, for each classified data value, a benchmark data value from among one or more benchmark data values stored in a second database corresponding to the classified data value;

generate, for each classified data value, a difference value between the classified data value and the respective retrieved benchmark data value; and store the associated difference value in the first database with the corresponding extracted data value.

21. The non-transitory computer-readable storage medium of claim 20, wherein the instructions include further instructions that cause the data performance system to:

retrieve, for each predetermined category, each corresponding stored difference value from the first database associated with the respective predetermined category and a predetermined time period, and run, for each predetermined category, each corresponding retrieved difference value through the one or more statistical algorithms to generate the respective data performance metrics.

* * * * *